Aug. 28, 1923.
G. E. HALLENBECK
1,466,128
DRILL PRESS CONTROL
Filed Nov. 28, 1921
2 Sheets-Sheet 2
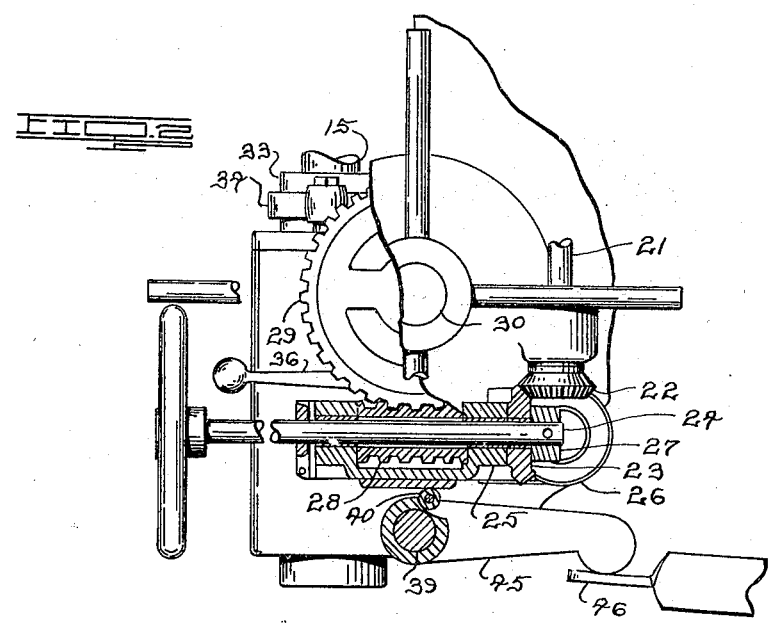
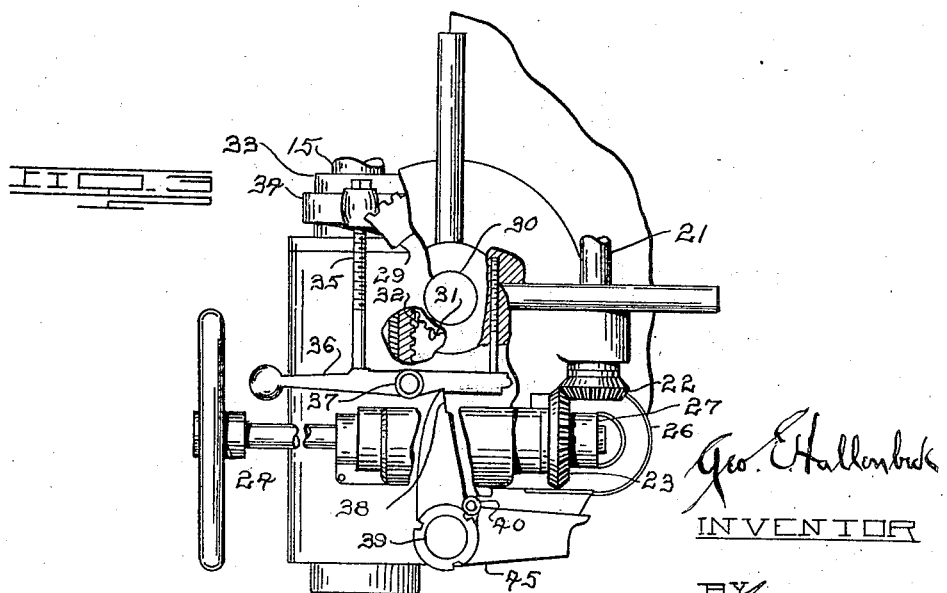

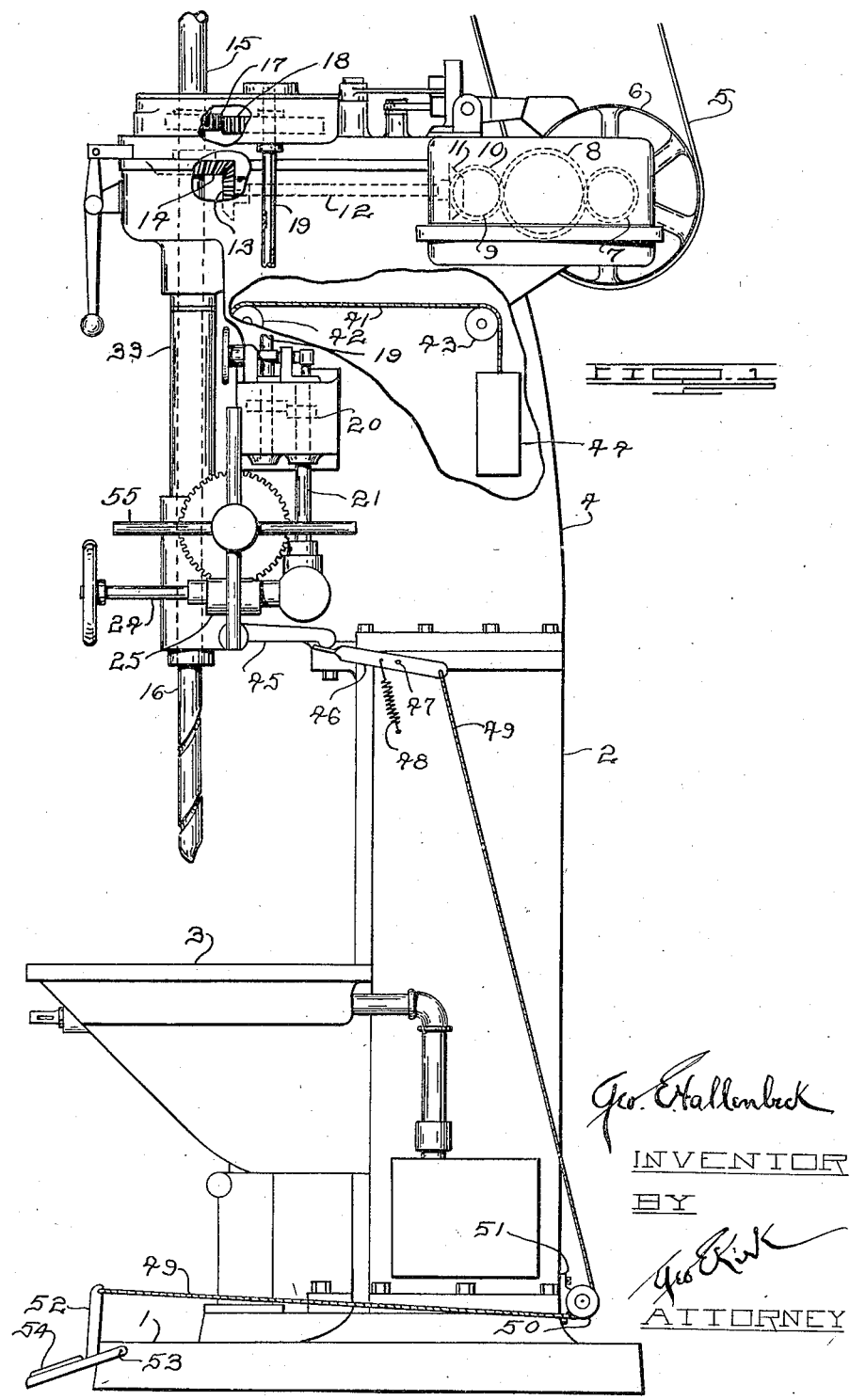

Patented Aug. 28, 1923.

1,466,128

UNITED STATES PATENT OFFICE.

GEORGE E. HALLENBECK, OF TOLEDO, OHIO, ASSIGNOR TO BAKER BROS., OF TOLEDO, OHIO, A FIRM.

DRILL-PRESS CONTROL.

Application filed November 28, 1921. Serial No. 518,389.

*To all whom it may concern:*

Be it known that I, GEORGE E. HALLENBECK, a citizen of the United States of America, residing at Toledo, Lucas County, Ohio, have invented new and useful Drill-Press Controls, of which the following is a specification.

This invention relates to features of control for increasing the output of drill presses.

This invention has utility in permitting foot control of drill presses and thereby allowing the operator to use the hands at all times in shifting and placing the work.

Referring to the drawings:

Fig. 1 is a side elevation, with parts broken away, of a drill press having incorporated therewith an embodiment of the invention;

Fig. 2 is a detail view showing the cooperative position of the reset device at the resetting end of the control herein; and Fig. 3 is a detail of the region of the control for being tripped, parts being broken away.

A base 1 is provided from which uprises a column 2 carrying forwardly thereof an adjustable work table 3. This column 2 carries a machine tool frame or head 4 to overhang the table 3. Driving belt 5 about pulley 6 serves through gearing 7, 8, 9, 10, 11, to rotate shaft 12 carrying pinion 13 thereon in mesh with gear 14 upon rotary drill spindle 15 forwardly in the head 4 and downwardly extending toward the work table 3 to have tool 16 carried by this rotary spindle 15 operate upon work upon table 3.

This spindle 15 has thereon pinion 17 in mesh with gear 18 upon vertical shaft 19 connected to speed change gear box 20 to drive shaft 21 having on the lower portion thereof bevel gear 22 in mesh with bevel gear 23 loosely mounted on shaft 24. This shaft 24, as well as pinion 23, is carried by bracket 25 carried to swing from bearing 26. Member 27 on the shaft 26 serves to engage this bevel gear 23 on the shaft 24 for coupling this bevel gear to drive the shaft 24 and through clutch shaft 24 to rotate worm 28 in mesh with worm wheel 29 on the shaft 30. This shaft 30 in the head 4 has pinion 31 in mesh with rack 32 upon sleeve 33 connected for feeding the shaft or rotary spindle 15 downwardly toward the work table 3.

In the operation of this drill press as the drill spindle 15 is fed downwardly toward the work table 3 by the operation of the feed drive through the rack 32 the collar 34 carried by the sleeve 33 has adjustable stop 35 thereon to determine limit of travel, strike arm 36 mounted on the bearing 37, and rock this arm 36 to clear latch 38. The latch 38 is accordingly released to swing upon hinge bearing 39 and thereby has nose 40 move away from the worm wheel 29 for allowing the bracket 28 including the shaft 24 to fall away from the worm gear 29 and thus move the worm 28 out of mesh therewith. This is accordingly an automatic cut-out for the feed drive of the spindle 15.

Immediately the member 15 is thus released from the feed drive, cable 41 connected to the sleeve 33 passing over guide pulleys 42, 43, to counterweight 44, serves to pull this rotary driving spindle upward away from the table 3 and out of the work on such table.

Extending from the bearing 39 and rigid with the bracket carrying nose 40 as well as the latch 38, is arm 45 toward which is thrown lever arm 46. This lever is pivoted on bearing 47. The nose or end of this lever 46 is drawn away from this arm 45 normally by spring 48. Opposing this action of the spring 48 and at the opposite end of this lever 46 there is connected cable 49 extending to guide pulley 50 near the base 1 of this machine. This guide pulley 50 is mounted in bracket 51. From this rearward position at the frame 1 this cable 49 extends forwardly to upwardly extending arm 52 mounted on bearing 53 having integral therewith a tread or foot actuated portion 54. Accordingly, when the limit position of the spindle 15 upward has been reached and the operator, by devoting full attention with his hands to not only shifting the work or properly placing the work upon the table 3, when such operation has been completed, can still retain his hold on work in the manual shifting or placing of the work to be handled and depress this pedal 54, at once through the control connection shifting the arm 45 upward against the resistance of the spring 48 and thereby automatically reset the feed for this continuously rotating spindle 15.

There is accordingly in the disclosure herein, a device embodying a continuously rotating tool member, which tool member is reciprocable into and out of working position with the rotation continuing at all times. The action of this tool upon the work is effected through the feed device and this feed device as herein disclosed involves an automatic counterweighted recovery with a positive feed at a determined rate during the opposite travel of this rotary member. The control for the reset is as herein disclosed foot operated and permits an increase of output on the machine owing to the fact that at once the operator has the part in about the position to receive the operation of the tool, the operation of the tool may be started without the release of the work by the operator.

The mass of the counterweight 44 is sufficient to give quite a high speed in the regular or upward travel of the tool 16 upon tripping. In instances where the re-operation of the tool is to a position just clear of the face or upper side of the work, such tool is thus in position for the subsequent operation. Automatically resetting the trip may leave both hands free for handling the work during the entire resetting and work shifting operation. However, in some instances the tool may ride a sufficient distance to clear the higher portions of the work above that where the drilling operation occurs. In such instances for high speed operation, manual feeding of the tool down by operating arms 55 may be in order. This downward feeding may occur with one hand, still leaving the other hand free to position the work, and a foot may effect the resetting when the desired amount of manual down feed against the counterweight has occurred.

The mass of the counterweight is such that were the handles 55 released the tool would at once feed back before the operator could effect a manual resetting with that same hand.

What is claimed and it is desired to secure by Letters Patent is:

1. A machine tool embodying a rotary member, continuous driving means therefor as to which the member is reciprocable while continuing to rotate, a counterweight for shifting the member in one direction, a positive feed for shifting the member in the other direction, a power drive for the feed, a trip for cutting out the feed and allowing the counterweight to shift the member, a reset for reconnecting the positively driven feed for again effecting shifting of the member, and a foot operating device for throwing the reset.

2. A machine tool embodying a rotary tool carrying member, continuous driving means therefor as to which the member is reciprocable while continuing to rotate, a counterweight for shifting the member in one direction, a positive feed for shifting the member in the other direction, said feed including a worm, a worm wheel, a power drive for the worm, a pivotally mounted shaft carrying the worm, a trip to be engaged by the member, and including a holder for releasing the worm shaft for moving away from the worm wheel, a rockable arm for resetting the worm, and a foot operating device for rocking the arm into worm resetting position.

In witness whereof I affix my signature.
GEORGE E. HALLENBECK.